(12) United States Patent
Cho et al.

(10) Patent No.: US 8,265,462 B2
(45) Date of Patent: *Sep. 11, 2012

(54) RECORDING MEDIUM HAVING A DATA STRUCTURE FOR MANAGING A TRANSPORT STREAM RECORDED THEREON AND METHODS AND APPARATUSES FOR RECORDING AND REPRODUCING

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1108 days.

This patent is subject to a terminal disclaimer.

(21) Appl. No.: 11/001,172

(22) Filed: Dec. 2, 2004

(65) Prior Publication Data
US 2005/0084249 A1    Apr. 21, 2005

Related U.S. Application Data

(63) Continuation of application No. 10/172,798, filed on Jun. 14, 2002, now Pat. No. 7,869,693.

(30) Foreign Application Priority Data

Jun. 15, 2001    (KR) ................. 2001-34009

(51) Int. Cl.
H04N 5/783    (2006.01)
(52) U.S. Cl. ........................ 386/334; 386/344

(58) Field of Classification Search ............... 386/46, 386/124, 125, 330, 332, 334, 335, 336, 344
See application file for complete search history.

(56) References Cited

U.S. PATENT DOCUMENTS

| | | | |
|---|---|---|---|
| 5,377,051 A | | 12/1994 | Lane et al. |
| 5,517,250 A | * | 5/1996 | Hoogenboom et al. . 375/240.27 |
| 5,535,008 A | | 7/1996 | Yamagishi et al. |
| 5,719,982 A | | 2/1998 | Kawamura et al. |
| 5,801,781 A | * | 9/1998 | Hiroshima et al. ........... 348/441 |
| 5,818,547 A | | 10/1998 | Ozaki |
| 5,832,085 A | | 11/1998 | Inoue et al. |
| 5,850,501 A | | 12/1998 | Yanagihara |
| 6,021,168 A | | 2/2000 | Huh |
| 6,061,399 A | * | 5/2000 | Lyons et al. .................. 375/240 |
| 6,072,771 A | * | 6/2000 | Anderson et al. ............. 370/216 |
| 6,118,486 A | | 9/2000 | Reitmeier |
| 6,169,843 B1 | | 1/2001 | Lenihan et al. |

(Continued)

FOREIGN PATENT DOCUMENTS

CN    1221284    6/1999

(Continued)

OTHER PUBLICATIONS

Zhaohui et al, "ARISC Implementation of MPEG 2 TS Packetization", 2000, pp. 688-691.*

(Continued)

Primary Examiner — David Harvey
(74) Attorney, Agent, or Firm — Harness, Dickey & Pierce

(57) ABSTRACT

The recording medium stores a transport stream formed of packets. The packets represent one or more PES packets and are grouped into units of a fixed number of packets. A first portion of each unit corresponds to a first portion of a PES packet.

8 Claims, 2 Drawing Sheets

U.S. PATENT DOCUMENTS

| | | | |
|---|---|---|---|
| 6,181,872 B1 | 1/2001 | Yamane et al. | |
| 6,211,800 B1 | 4/2001 | Yanagihara et al. | |
| 6,285,823 B1* | 9/2001 | Saeki et al. | 386/241 |
| 6,285,825 B1* | 9/2001 | Miwa et al. | 386/98 |
| 6,373,856 B1 | 4/2002 | Higashida | |
| 6,460,097 B1 | 10/2002 | Harumoto et al. | |
| 6,467,093 B1 | 10/2002 | Inoue et al. | |
| 6,542,518 B1* | 4/2003 | Miyazawa | 370/468 |
| 6,567,409 B1 | 5/2003 | Tozaki et al. | |
| 6,580,869 B1 | 6/2003 | Ando et al. | |
| 6,618,549 B1 | 9/2003 | Kato et al. | |
| 6,754,273 B1 | 6/2004 | Sackstein et al. | |
| 6,782,189 B2 | 8/2004 | Ando et al. | |
| 6,792,198 B1 | 9/2004 | Kim et al. | |
| 6,823,010 B1* | 11/2004 | Curet et al. | 375/240.12 |
| 6,865,747 B1 | 3/2005 | Mercier | |
| 6,901,078 B2 | 5/2005 | Morris | |
| 6,920,178 B1 | 7/2005 | Curet et al. | |
| 6,973,258 B1* | 12/2005 | Yoo et al. | 386/330 |
| 7,088,911 B2 | 8/2006 | Himeno et al. | |
| 7,096,488 B1* | 8/2006 | Zhang et al. | 725/105 |
| 7,106,749 B1 | 9/2006 | Darshan et al. | |
| 2001/0026561 A1* | 10/2001 | Morris et al. | 370/487 |
| 2002/0016970 A1* | 2/2002 | Negishi et al. | 725/88 |
| 2002/0018643 A1* | 2/2002 | Okada et al. | 386/95 |
| 2002/0118953 A1 | 8/2002 | Kim | |
| 2002/0121658 A1* | 9/2002 | Liu et al. | 257/296 |
| 2002/0159758 A1* | 10/2002 | Okuyama et al. | 386/95 |
| 2003/0043847 A1 | 3/2003 | Haddad | |
| 2003/0133699 A1* | 7/2003 | Ando et al. | 386/95 |
| 2003/0189879 A1 | 10/2003 | Ishii et al. | |
| 2004/0081435 A1 | 4/2004 | Maehashi et al. | |
| 2005/0259946 A1 | 11/2005 | Kitamura | |
| 2008/0019673 A1* | 1/2008 | Hamasaka et al. | 386/124 |

FOREIGN PATENT DOCUMENTS

| | | |
|---|---|---|
| CN | 1222735 | 7/1999 |
| EP | 0 917 355 A1 | 5/1999 |
| EP | 0863669 | 11/2001 |
| JP | 06-178288 | 6/1994 |
| JP | 08-140043 | 5/1996 |
| JP | 11-045512 | 2/1999 |
| JP | 11-261963 | 9/1999 |
| KR | 1998-40115 | 8/1998 |
| KR | 10-0252108 | 1/2000 |
| KR | 000026049 | 5/2000 |
| WO | WO 98/40889 | 9/1998 |
| WO | WO 00/22835 | 4/2000 |
| WO | WO 00/30358 * | 5/2000 |
| WO | WO 01/20826 | 3/2001 |

OTHER PUBLICATIONS

Translation of Chinese Office Action.

Office Action for related U.S. Appl. No. 10/172,798 dated Dec. 10, 2008.

U.S. Office Action for U.S. Appl. No. 10/172,798 dated Oct. 23, 2009.

* cited by examiner

RECORDING MEDIUM HAVING A DATA STRUCTURE FOR MANAGING A TRANSPORT STREAM RECORDED THEREON AND METHODS AND APPARATUSES FOR RECORDING AND REPRODUCING

RELATED APPLICATION DATA

This is a continuation application of application Ser. No. 10/172,798 filed Jun. 14, 2002 now U.S. Pat. No. 7,869,693; the entire contents of which are hereby incorporated by reference. This application also claims priority under 35 U.S.C. 119 on Korean Application No. 10-2001-0034009 filed Jun. 15, 2001; the entire contents of which are hereby incorporated by reference.

BACKGROUND OF THE INVENTION

1. Field of the Invention

The present invention relates to methods and apparatuses of recording and reproducing digital data stream on a recording medium such as a high-density digital versatile disk (called 'HD-DVD' hereinafter).

The present invention further relates to a recording medium on which digital data stream has been written.

2. Description of the Related Art

Owing to technical improvement in the fields of video/audio data compression, digital modulation/demodulation, and so on, a digital television broadcast system broadcasting IV signals in the form of digital data stream is being standardized rapidly.

In the digital television broadcast system, audio/video (A/V) signals to be broadcast are compressed according to the data compressing rule specified by MPEG 2 (Moving Picture Experts Group) and the compressed A/V data are broadcast in the form of a transport stream (TS), which is also defined in the MPEG 2 standard, composed of a series of 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

In the meantime, a new device is being developed to prepare for commercialization of a digital TV broadcast system. That is a digital recorder able to receive a TS of digital broadcast programs and record it on a writable HD-DVD is being developed. Such a digital recorder will be widely used as the digital TV broadcast system is commercialized in earnest.

Digital A/V data compressed in the manner of MPEG 2 for the digital TV broadcast system are composed of I- (Intra-), P- (Predictive-), and B- (Bidirectionally predictive-) pictures. An I picture is a basic picture and a P or a B picture can be presented as a video frame if there is an associated I picture.

In the digital TV broadcast system, the compressed digital A/V data are divided and inserted in each payload field of a series of 188-byte-long (inclusive of header) TPs, which are broadcasted sequentially.

Then, the digital recorder would record the TPs carrying TV broadcast programs on a writable HD-DVD in the same order as they are received. During the recording operation, a predetermined-sized, e.g., 4-byte time stamp indicative of packet arrival time may be added to each TP.

If the recorded TPs reaches some pack amount, e.g., 32 packs during the TP recording, the digital recorder groups those packets into a single 'high-density stream object unit' (called 'HOBU' hereinafter) and creates and writes search information for that HOBU as navigation data. The search information includes location or location-associated time information pointing to the head of a HOBU.

However, if the broadcasted TPs are recorded in the same order as they are received as aforementioned, the head of each HOBU is not aligned with the start of an arbitrary picture as shown in FIG. 1. In case that digital data stream has been recorded as shown in FIG. 1, when the digital recorder searches the recorded digital data stream for a certain scene equivalent to a picture a user wants to view, it searches by jumping in the unit of HOBU with reference to the stored search information for all HOBUs.

However, because a HOBU includes the rest data of a previous picture in its head area as shown in FIG. 1, a complete video frame can not be constructed from the data in the head area. Therefore, the digital recorder must discard the remaining data of a previous picture in the current HOBU and obtain a complete picture data from successive TPs following the discarded data. After the obtained complete picture data are presented as a video frame, the digital recorder may confirm whether or not reproduction is to be started from the presented picture based on user's command, e.g., 'continue searching' or 'play'.

However, the additional searching operation within a HOBU for a complete picture takes more searching time. Namely, it makes random accessibility of recorded digital data stream difficult.

If the remaining data of a previous picture are output without discarding, noise might be generated in a video frame.

Consequently, if a digital data stream of digital TV broadcast programs are recorded as they are received, the aforementioned disadvantages would arise inevitably.

On the other hand, if a read-only HD-DVD containing an A/V digital data stream to be presented through a digital television set is manufactured, without any consideration of alignment of the head of each HOBU with picture start, in the manner that digital data stream is divided and filled in each payload field of successive TPs with which HOBUs are packed, as illustrated in FIG. 1, then, such-manufactured read-only HD-DVD would still have the aforementioned drawbacks such as bad random-accessibility.

SUMMARY OF THE INVENTION

A recording medium according to the present invention includes a data structure for managing a transport stream.

In one embodiment, the recording medium stores a transport stream formed of packets. The packets represent one or more PES packets and are grouped into units of a fixed number of packets. In one embodiment, a first portion of each unit corresponds to a first portion of a PES packet.

In an embodiment, the first portion of each unit includes a first portion of data for a picture.

According to another embodiment, a unit may include padding when an insufficient number of the fixed number of packets are available to carry the transport stream such that the first portion of a next unit includes the first portion of data for a picture and/or such that the first portion of a next unit includes the first portion of a PES packet.

The present invention further provides apparatuses and methods for recording and reproducing the data structure according to the present invention.

BRIEF DESCRIPTION OF THE DRAWINGS

The accompanying drawings, which are included to provide a further understandings of the invention, illustrate the exemplary embodiments of the invention, and together with the description, serve to explain the principles of the present invention.

DETAILED DESCRIPTION OF THE EXEMPLARY EMBODIMENTS

In order that the invention may be fully understood, an example embodiment thereof will now be described with reference to the accompanying drawings.

Figure 1:
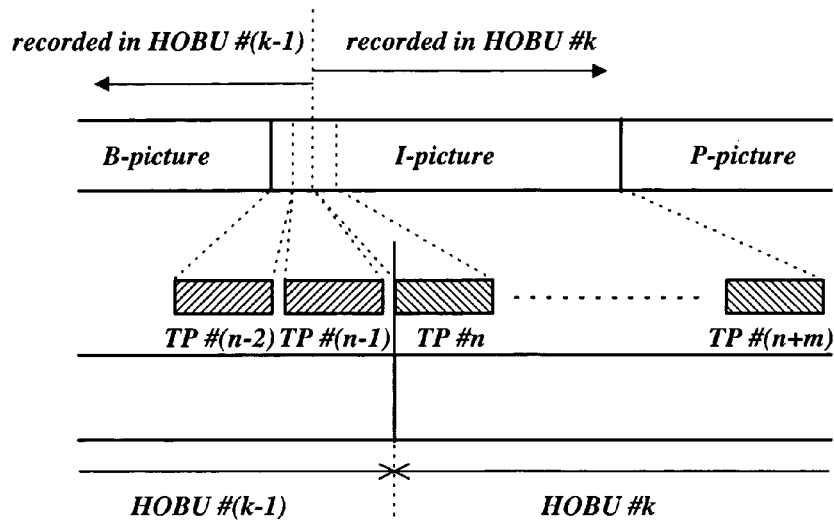
FIG. 1 shows an example of data format formed by a conventional recording method in which a transport stream is recorded as received.
Figure 2:
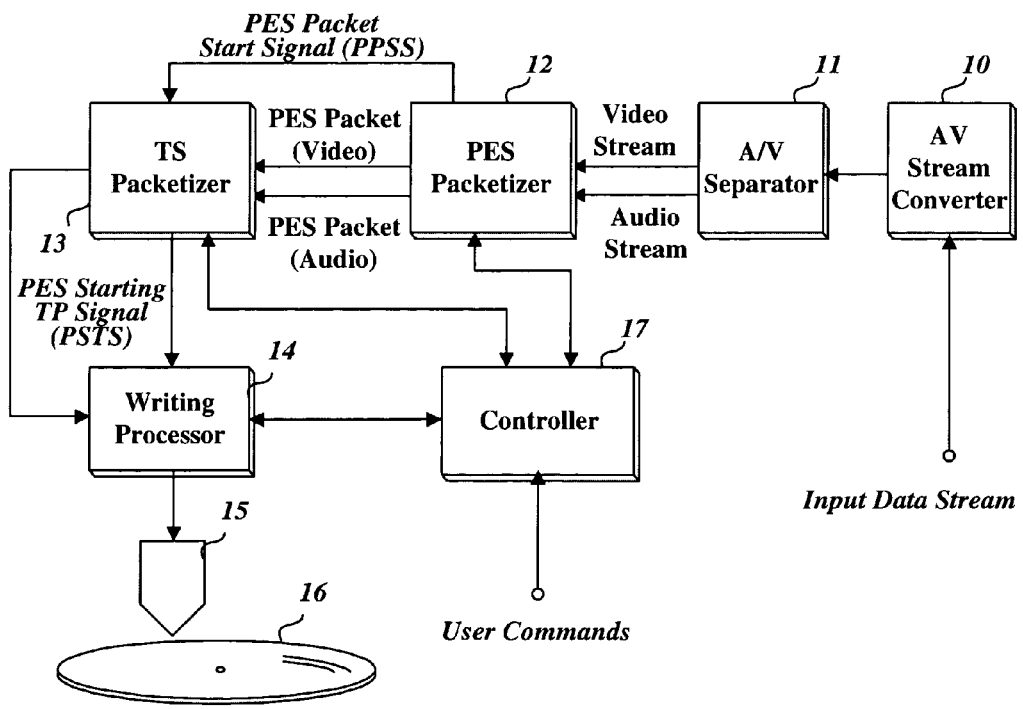
FIG. 2 is a block diagram of an embodiment of a digital recorder recording a digital data stream on a writable medium in accordance with an embodiment of the present invention.

FIG. 2 is a block diagram of an embodiment of a digital recorder recording a digital data stream on a writable medium in accordance with an embodiment of the present invention.

The digital recorder of FIG. 2, which may be a video disk recorder (called 'VDR') being able to write digital A/V data on a writable HD-DVD, comprises an A/V stream converter 10 converting a received A/V signal to A/V data stream compressed according to MPEG 2 standard; an A/V stream separator 11 separating the compressed A/V data stream into audio and video stream; a PES packetizer 12 packetizing the audio and the video stream into PES (Packetized Elementary Stream) packets defined in MPEG 2 standard, respectively; a TS packetizer 13 slicing the video and the audio PES packets, respectively, to make respective series of TPs, and multiplexing the respective series of video and audio TPs into a single TS; a writing processor 14 re-formatting the TS from the TS packetizer 13 to record/reproduction suitable structure and outputting disk writing signals corresponding to the re-formatted data; an optical pickup 15 forming marks and spaces along a track of an inserted writable HD-DVD according to the disk writing signals; and a controller 17 receiving information on data size being written, creating search information based on the received information, and writing all of the created search information on the writable HD-DVD 16 through the writing processor 14.

The A/V stream converter 10, if a digital TV broadcast program formatted in TS is received, extracts compressed A/V data stream from the TS through decoding successive TPs. However, if non-MPEG formatted program stream broadcast by other standard of digital TV broadcast system, e.g., DirecTV is received, the A/V stream converter 10 performs a decoding algorithm suitable to that system to extract A/V data, and compresses the extracted A/V data again according to data compressing rule of MPEG 2 standard. If an analog A/V signal is received, the A/V stream converter 10 digitizes audio and video signal, respectively, and conducts MPEG 2 compressing operation for the respective digitized signal.

Figure 3:
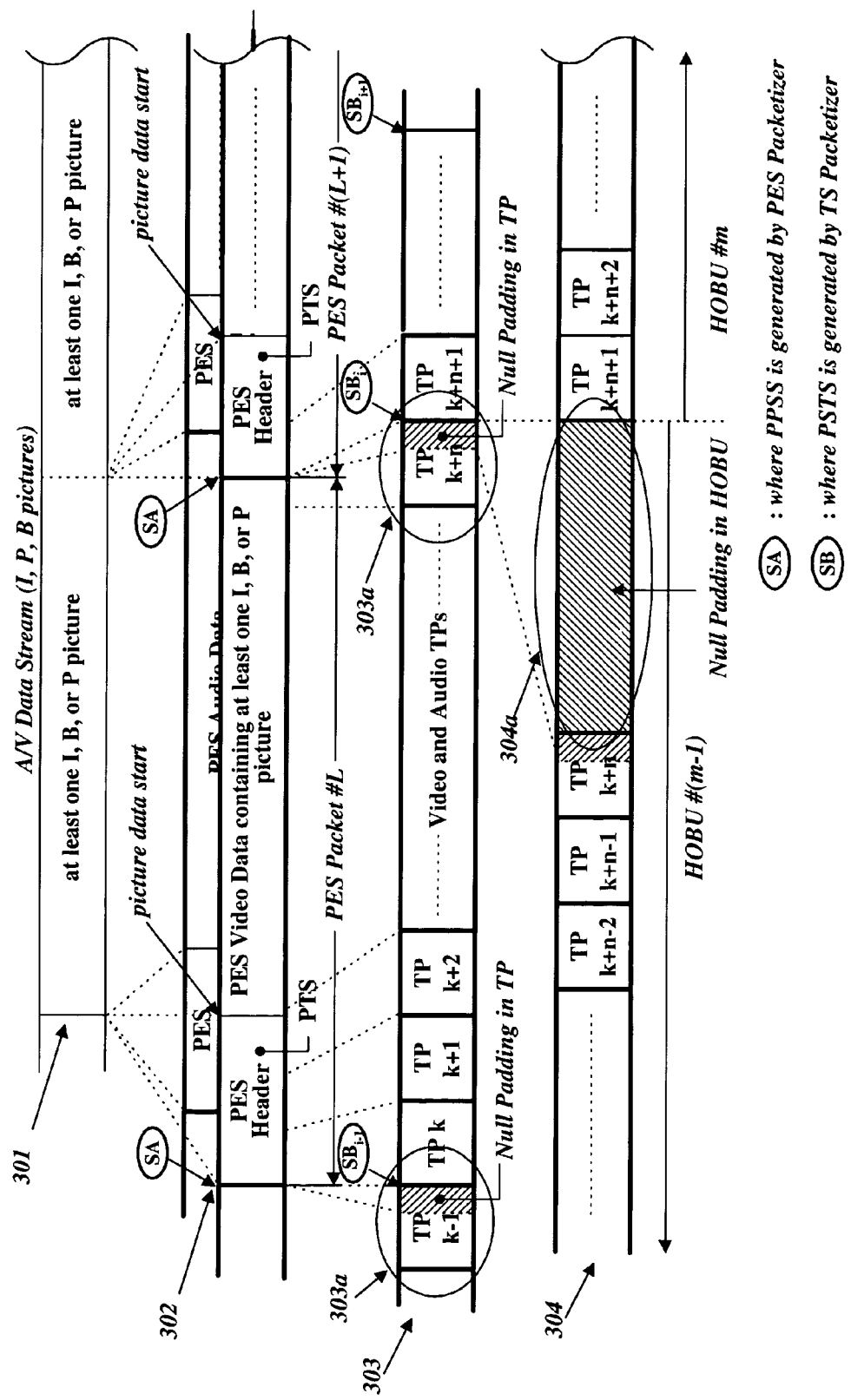
FIG. 3 shows a schematic process of recording received A/V data stream in accordance with an embodiment of the present invention.

FIG. 3 shows a schematic process of recording a received A/V data stream in accordance with an embodiment of the present invention.

A received data stream of an arbitrary format is converted to MPEG 2-compressed data stream 301 by the A/V stream converter 10. Then, the PES packetizer 12 at the next stage analyzes video stream of the A/V data stream 301 to search for every I-, P-, and B-picture section, and composes a PES packet with at least one picture section. The PES packetizer 12 also composes a PES packet with audio data stream of each frame group.

At this time, a PES header is added at the front of each PES packet to form a complete PES packet. A Presentation Time Stamp (PTS) for a picture included in a PES packet is written in a PES header thereof. A Decoding Time Stamp (DTS) for an included picture is optionally written in a PES header.

Through the above operations, the PES packetizer 12 outputs a data stream 302 shown in FIG. 3.

When the PES packetizer 12 transmits the composed data stream 302 to the TS packetizer 13, it also sends a 'PES packet start signal' (PPSS) indicative of transmission of start data of a video PES packet, in the strict sense, PES header of a video PES packet to the TS packetizer 13. The TS packetizer 13 slices the video and the audio PES packets, respectively, to make two series of video and audio TPs, and multiplexes the video and the audio TPs into a single TS 303 which is depicted in FIG. 3.

If the PPSS is received from the PES packetizer 12 while making TPs from received data, the TS packetizer 13 starts to insert just-received data in a payload field of the next video TP, namely, it creates a new TP and writes data received concurrently with the PPSS in the created new TP. If a current video TP is not fully filled with received data at the time when the PPSS is received, its remaining area is padded with null data. The elliptic zones 303a in FIG. 3 show partially null-padded TPs through the above operations of the TS packetizer 13.

The TS packetizer 13 delivers TPs to the writing processor 14 in the same order as they are multiplexed. If a TP being delivered at present contains start data of a sliced PES packet, then the TS packetizer 13 notifies the writing processor 14 of that fact by sending PES starting TP signal (PSTS) concurrently to the writing processor 14.

The writing processor 14 gathers the received TPs. Whenever the PSTS is received from the TS packetizer 13, the writing processor 14 checks whether or not TPs gathered until now are larger than the size of a single HOBU, a grouping unit of the writable HD-DVD 16. If not greater, the writing processor 14 only memorizes the location, e.g., '$SB_i$' of a TP received at the same time as the PSTS, and continues to gather the TPs received thereafter. If greater, for example, if current case is at '$SB_{i+1}$', the writing processor 14 re-formats the gathered TPs excluding back TPs placed from a previously-memorized position '$SB_i$' to form writing data group for a single HOBU, and modulates and outputs the formed writing data group.

The size of writing data group formed for a single HOBU may be less than the capacity of a single HOBU because of the exclusion of back TPs which would cause, if included in the writing data group, the whole gathered TPs to exceed the capacity of a HOBU. For example, the number of gathered TPs may exceed the fixed number of TPs forming each HOBU (e.g., 32 packs). Therefore, the writing processor 14 generates additional null data of which size is equal to the remaining capacity of a HOBU. Namely, when the number of TPs being recorded will be less than, for example, the fixed number of TPs of an HOBU, the remaining TPs and/or portion of a TP is padded with null data. Stated another way, the generated null data follows the outputted writing data group and are written in the remaining area of the HOBU. The null data padded in the HOBU are sure to prevent possible reproducing or decoding errors.

Next successive TPs are gathered to the remaining TPs not included in the formed writing data group for a HOBU, namely, TPs existing from the previously-memorized position 'SB$_i$' to the just-received position 'SB$_{i+1}$' and the latest TP received concurrently with the PSTS, and they will be written in the next HOBU when the gathered size is greater than the capacity of a single HOBU. Consequently, the next HOBU will also begin with start data of a picture, in the strict sense, header of a PES packet of which data field begins with start data of a picture.

The modulated signals output from the writing processor 14 are written in the form of marks and spaces on the writable HD-DVD 16 through the optical pickup 15.

In the meantime, after forming the writing data group for a single HOBU, the writing processor 14 informs the controller 17 of the writing data group formation for a single HOBU and the number of the PSTSs received until the writing data group formation.

On the other hand, the controller 17 continuously receives and stores PTSs written in the PES header of each PES packet by the PES packetizer 12. Thus, if the writing data group formation for a single HOBU is informed along with the number of the PSTSs, the controller 17 calculates a PTS time length of the present writing data group formed for a single HOBU based on the stored PTSs of every PES packet to create search information for that HOBU. The search information may include the PTS time length of each HOBU and accumulated PTS time length up to each HOBU (optionally, it need not include size information and accumulated size information of each HOBU if the size of a HOBU is constant (e.g., a fixed number of TPs HOBUs)). The search information will be created for each HOBU-sized data, and it is transmitted to the writing processor 14 to be written on a pre-assigned area as navigation data in the middle of A/V data recording operation or after A/V data recording is done.

According to the explained writing operation of the writing processor 14, the received A/V data stream forms a data written format 304 on the writable HD-DVD 16 as shown in FIG. 3.

In other words, the head of each HOBU is aligned with the start data of a PES packet, namely, the start of an arbitrary picture.

Therefore, when the controller 17, in search mode, identifies a certain HOBU using the navigation data and accesses the identified HOBU, an additional searching operation for a picture start is not necessary because the start of the identified HOBU is exactly a picture start.

The above-explained data stream recording format 304 of FIG. 3 is applicable, for example, to a read-only HD-DVD which stores A/V data stream in the form of pre-pits. Namely, A/V data stream is formed on a read-only HD-DVD in the manner that each HOBU begins with picture start data. In addition, search information for each HOBU is recorded in a navigation data area or as a navigation data file.

Needless to say, an additional searching operation in a HOBU for a picture start is removed for a such-manufactured read-only HD-DVD.

The above-explained A/V data stream recording method and apparatus, and a recording medium in which A/V data stream has been recorded through this method can improve random accessibility of a recorded A/V data stream and increase the actual data recording efficiency of a high-density recording medium.

It will be apparent to those skilled in the art that various modifications and variations can be made in the present invention without departing from the spirit or scope of the invention. Thus, it is intended that the present invention cover the modifications and variations of this invention.

We claim:

1. A recording medium having a data structure to be read by an apparatus for reproducing data, comprising:
    a recording area storing a transport stream in which a plurality of transport packets are multiplexed, the transport packets representing a plurality of Packetized Elementary Stream (PES) packets defined in MPEG 2 standard, the transport packets being grouped into units of a fixed number of transport packets, start data of each PES packet aligned with a first portion of a respective unit;
    wherein the apparatus reads at reproduction the start data of a PES packet from the start of the respective unit; and
    wherein a given unit includes padding when an insufficient number of the fixed number of transport packets are available in the given unit to carry the transport stream such that the first portion of a next unit includes start data of other PES packet.

2. The recording medium of claim 1, wherein the first portion of the respective unit includes a first portion of data for a picture.

3. The recording medium of claim 1, wherein the padding is at an end of the unit.

4. The recording medium of claim 1, wherein the padding is null values.

5. The recording medium of claim 2, wherein the picture for at least one unit is an I-picture.

6. A method of reproducing a transport stream from a recording medium, the method comprising:
    reproducing the transport stream in which a plurality of transport packets are multiplexed from the recording medium, the transport packets representing a plurality of PES packets defined in MPEG 2 standard, the transport packets being grouped into units of a fixed number of transport packets in the transport stream, start data of each PES packet being aligned with a first portion of a respective unit,
    wherein the start data of a PES packet is located by detecting the start of the respective unit, and wherein the first portion of the respective unit includes a first portion of data an I-picture.

7. An apparatus for reproducing a transport stream from a recording medium, the apparatus comprising:
    a pickup configured to reproduce data from the recording medium; and
    a controller configured to control the pickup to reproduce the transport stream in which a plurality of transport packets are multiplexed from the recording medium, the transport packets representing a plurality of PES packets defined in MPEG 2 standard, the transport packets being grouped into units of a fixed number of transport packets in the transport stream, start data of each PES packet being aligned with a first portion of a respective unit,
    wherein the start data of a PES packet is located by detecting the start of the respective unit, and wherein the first portion of the respective unit includes a first portion of data for an I-picture.

8. The apparatus of claim 7, wherein the first portion of the respective unit includes a first portion of data for an I-picture.

* * * * *